March 24, 1964 O. A. JORGENSEN 3,126,487

LOGIC DEVICE

Filed Dec. 11, 1959

INVENTOR
OTTO A. JORGENSEN
BY
F. H. Henson
ATTORNEY

United States Patent Office 3,126,487

Patented Mar. 24, 1964

3,126,487
LOGIC DEVICE

Otto A. Jorgensen, Pittsford, N.Y., assignor to General Dynamics Corporation, Rochester, N.Y., a corporation of Delaware Filed Dec. 11, 1959, Ser. No. 858,932
9 Claims. (Cl. 307—88)

Figure 1:
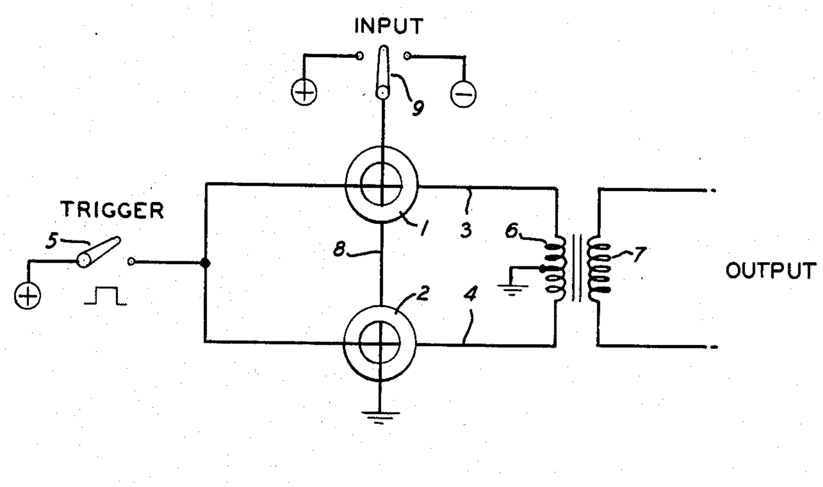

This invention relates to signaling systems and particularly to means generally known as logic devices, such as those employed in digital computers to transmit, amplify, store and employ information in the form of electrical signals representing binary digits.

The object of the invention is to provide simple, reliable and rugged means requiring a minimum of apparatus and of power for its operation to store and transmit binary information.

Within very recent years there has been devised and exploited an almost ideal logic device known as a Parametron which is essentially a tuned circuit having bistability amplification and memory and in which the two bistable states have the relation that the one is the opposite of the other. Reference is made to the Proceedings of the Institute of Radio Engineers, August 1959, and to an article on pages 1304 to 1316 therein by Eiichi Goto, entitled "The Parametron, a Digital Computing Element Which Utilizes Parametric Oscillation," for a comprehensive explanation of the theory and operation of such a logic device. The only part of the Parametron which requires any degree of precision in manufacture is the tuning of the device to the resonant frequency.

In accordance with the present invention, a device is provided which has all the properties of the Parametron, bistability, memory, amplification and two symmetrical but opposite output signals, but requires no tuning. The output is not in the form of a sinewave of one or another phase, but either a positive or negative pulse which may represent a binary digit 0 or 1.

The device of the present invention consists essentially of a pair of variable parameter reactors in the form of saturable reactors, such as the cores of square loop magnetic material, and a transformer put into a network whereby the cores may be driven to one or another configuration of opposite states by an input pulse and indefinitely thereafter both simultaneously driven to a normal state, the result of which is to produce in the said transformer either a positive or a negative output pulse. Where the cores have not been set and both are in the same state no output pulse will be produced since the effect in the transformer is to cancel the effect of one by the effect of the other.

A feature of the invention is a circuit component which may be set at any time to a state where the conventional transmission thereinto of a so-called clock pulse will result in the transmission therefrom of no pulse, a positive pulse or a negative pulse.

Another feature of the invention is a circuit component providing a transmission path for a conventional clock pulse having a set of parallel branches connected to output means responsive to different value currents transmitted thereover. In accordance with a preferred arrangement the variable parameter reactors in the said two parallel branches consists of inductance elements and the said current responsive output means is a transformer winding. With the inductance in the two said parallel branches differently adjusted the currents delivered to said transformer winding will be unequal so that where such transformer winding has a mid tap, the effect in the secondary thereof will be different.

Another feature of the invention is a means to restrict the output to a single pulse in response to the first trigger or clock pulse transmitted over this device after it has been set. It will be remembered that the clock pulse flows through two parallel circuits which are threaded through the two reactors in the same sense so that if these reactors are not set to produce a different result, they will both produce a like result whereby the effects in the primary of the terminal transformer winding are equal and opposite and the result in the output circuit is a null. Now, when the two reactors have been set differently, the first trigger pulse transmitted through these two parallel circuits will produce different results in the said primary circuit with the result that in the output circuit a positive or a negative pulse is now produced. However, the trigger pulse which produced this result operates to drive the two reactors to like states so that if this first trigger pulse is followed by a second or more, only the first will produce an output pulse while all succeeding trigger pulses will produce nulls.

Hence a feature of the invention may be stated as a means to translate a train of pulses into a single output pulse corresponding to the first pulse of said train.

Alternatively, the variable parameter reactors in the said two parallel branches may consist of capacitance varying reactors instead of inductors, in which case a voltage concept must be used instead of the current concept embodied in the said preferred arrangement. In general, the principle employed is the same. Also, in general, the use of capacitance varying reactors permits the use of higher clock pulse rates.

Since the said variable inductance elements in one case and the variable capacitance elements in another case may both be considered parameters, the present invention may be stated as the use of variable parameter reactors to selectively control the output of the device.

The device of the present invention is adapted for use in conventional systems, such as a three step excitation system similar to the arrangement for parametrons but does not require the provision of a source of high frequency power. Gating operations will be based on the majority rule principle and inversion can be accomplished with oppositely wound windings on the transformers. Delay is automatically obtained when the signal pulses are transferred through the system.

Other features will appear hereinafter.

Figure 2:
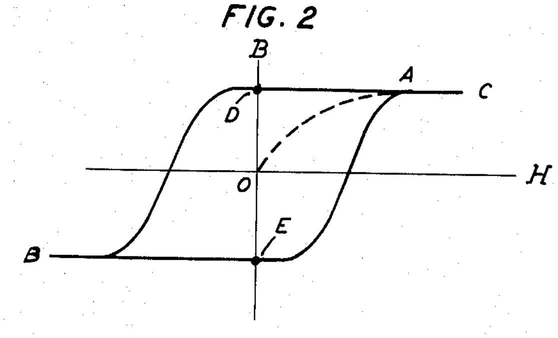

The drawings consist of a single sheet having two figures as follows:

FIG. 1 is a schematic circuit diagram showing how the working of finite cores may be controlled to produce pulse outputs; and FIG. 2 is a representation of the well known square loop hysteresis curve which characterizes finite cores.

FIG. 1 is a schematic circuit diagram showing the essential elements of the present invention. Two saturable reactors 1 and 2 are employed and these are in cooperative relationship with two parallel circuits 3 and 4 which may be energized by a trigger connection 5 to transmit a pulse, generally called a clock pulse, thereover. The two parallel circuits are threaded through the said reactors in the same sense and they are adjusted in their circuits to drive the said reactors to saturation. The two circuits 3 and 4 terminate in the ends of a transformer winding 6 which has a mid tap connection to ground (or the opposite terminal of the source of current used for the trigger pulse). Hence, if the two reactors 1 and 2 are both in the same condition, upon the transmission of a trigger pulse the currents in the transformer winding 6 will be equal and opposite in their effects so that the effect in the output winding 7 will be a null. Thus, only the first of what might be a train of trigger pulses could produce in the output 7 anything else than a null.

There is provided another circuit 8 threaded differently through the reactors 1 and 2 and capable of driving these reactors to saturation. The switch 9 is herein used merely as an indication of means employed to set the reactors 1 and 2 to one or another configuration of states in each of which the two reactors are differently set.

These variable parameter reactors may be in the form of the ubiquitous square loop magnetic cores whereby they may be set by a means represented by the switch 9 ready to translate the first trigger pulse of a train thereafter transmitted by a means represented by the switch 5 into a positive or a negative outgoing pulse, or where a means is provided to limit the transmission of a trigger pulse to a single such pulse to translate that pulse into a positive or a negative outgoing pulse.

Where such a square loop core is employed as a variable parameter reactor, the operation thereof may be explained by the help of FIG. 2. In the conventional manner, if the core is driven to saturation at point A in the direction of C, on relaxation its magnetic state will return to D and likewise, if it is driven toward B, then on relaxation it will retreat to E. If, while it is in state D, it is again driven toward C, it being substantially already saturated will present a low impedance in the circuit, but if it is in the state E then, as the curve goes through the steep ascent from E to A, it will present a high impedance in the circuit.

Thus, if the two reactors 1 and 2 are both in the same state, either state D or state E, the result in the driving circuits will be equal and since they will be opposite in the transformer winding 6, the output result will be a null. However, if these two reactors are in opposite states then the low impedance of one and the high impedance of the other will produce unlike results in the corresponding halves of the transformer winding 6 with the result that a positive pulse or a negative pulse will be developed in the output winding 7.

What is claimed is:

1. In combination, first and second variable parameter reactors, first circuit means for setting a selected one of said reactors to one impedance state and the other of said reactors to a different impedance state, an output circuit, second circuit means for coupling a readout signal to said variable parameter reactors, said second circuit means comprising a circuit having said first and second reactors in individual parallel branches, means for coupling said second circuit to said output circuit, said last named means responsive to said readout signal for causing said output circuit to generate an output signal indicative of the relative impedances of said reactors to said readout signal.

2. The combination set forth in claim 1 wherein said variable parameter reactors are inductive.

3. The combination set forth in claim 1 and including means in said second circuit for setting said reactors to identical impedance states when a readout signal is coupled to said second circuit.

4. The combination set forth in claim 1 and including means in said second circuit for inhibiting an output signal in response to a readout signal when said first and second reactors have identical impedance states.

5. In combination, first and second variable parameter reactors, first circuit means for setting a selected one of said reactors to one impedance state and the other of said reactors to a different impedance state, a source of readout signals, an output circuit, second circuit means for coupling a readout signal from said source of readout signals to said output circuit, said second circuit means comprising two parallel branches with one terminal of each branch connected to said source of readout signals and the other terminal of each branch connected to said output circuit and with each branch including one of said variable parameter reactors, and said output circuit including means responsive to an unbalance of current through the parallel branches of said second circuit for causing said output circuit to generate an output signal indicative of the one of said parallel branches of said second circuit which had the larger current when a readout signal is coupled to said second circuit from said source of readout signals.

6. The combination set forth in claim 5 wherein said reactors are set to identical impedance states in response to the flow of current through the parallel branches of said second circuit.

7. The combination set forth in claim 5 wherein said output means responds in a first and second manner to said readout signal when said first reactor is set to a higher and lower impedance state, respectively, than said second reactor.

8. The combination set forth in claim 7 wherein said output means responds in a third manner to said readout signal when said first and second reactors are set to identical impedance states.

9. The combination set forth in claim 7 wherein said output means produces a single output signal in response to a series of readout signals without intermediate changes in the impedance state of at least one of said reactors.

References Cited in the file of this patent

UNITED STATES PATENTS

| | | |
|---|---|---|
| Re. 24,358 | Whitney | Sept. 17, 1957 |
| 2,680,819 | Booth | June 8, 1954 |
| 2,719,773 | Karnaugh | Oct. 4, 1955 |
| 2,729,808 | Auerbach | Jan. 3, 1956 |
| 2,734,184 | Rajchman | Feb. 7, 1956 |
| 2,781,504 | Canepa | Feb. 12, 1957 |
| 2,801,344 | Lubkin | July 30, 1957 |
| 2,909,673 | Gunderson | Oct. 20, 1959 |
| 3,002,107 | Henle et al. | Sept. 26, 1961 |

OTHER REFERENCES

Publication: IBM Technical Disclosure Bulletin, vol. 2, No. 1, June 1959, p. 31.